April 26, 1938. R. L. WILCOX ET AL 2,115,604
NUT THREADING MACHINE
Filed Sept. 15, 1937 3 Sheets-Sheet 2
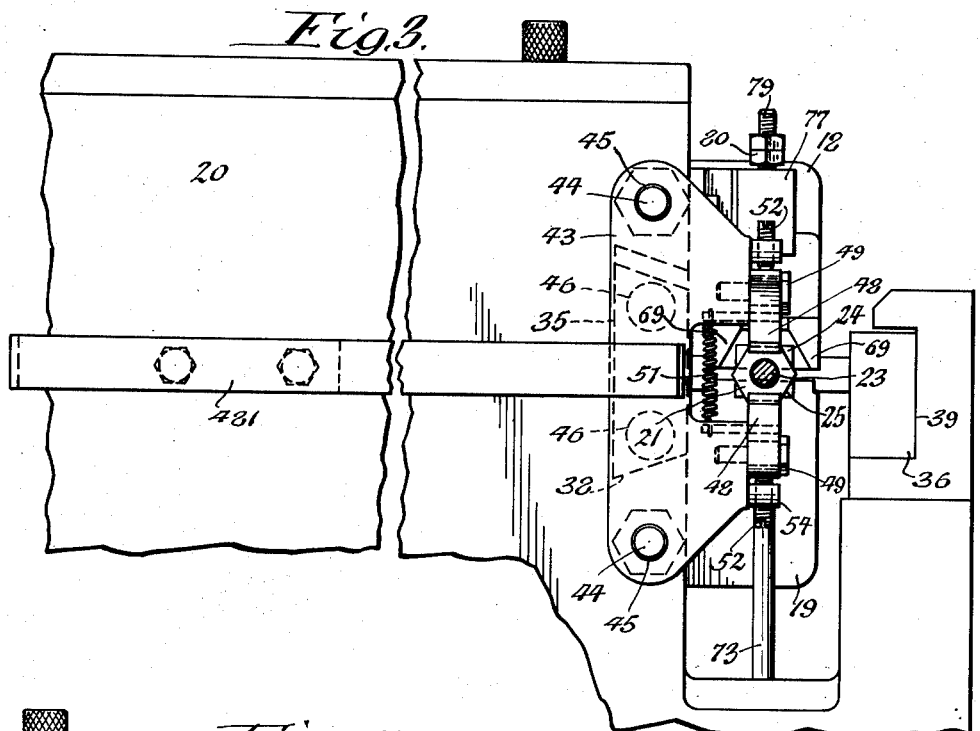
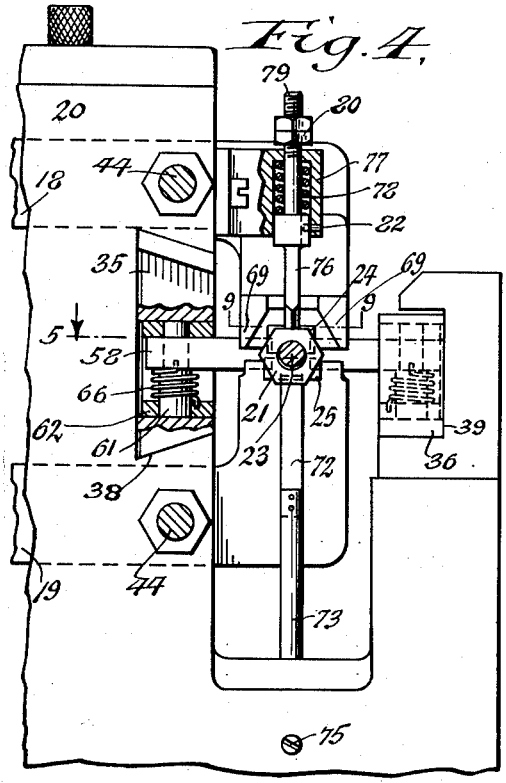
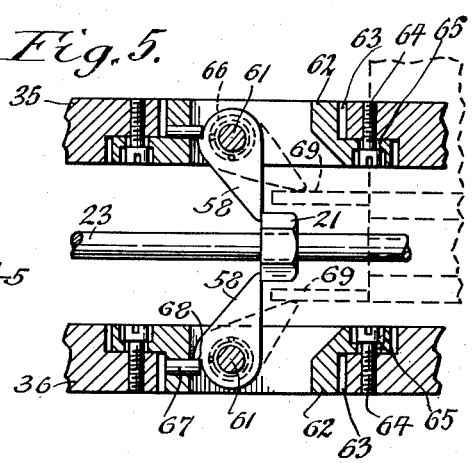
G. Kroupsky
J. Werner
R. L. Wilcox
INVENTORS
BY Popp & Popp
ATTORNEYS April 26, 1938.  R. L. WILCOX ET AL  2,115,604
NUT THREADING MACHINE
Filed Sept. 15, 1937   3 Sheets-Sheet 3
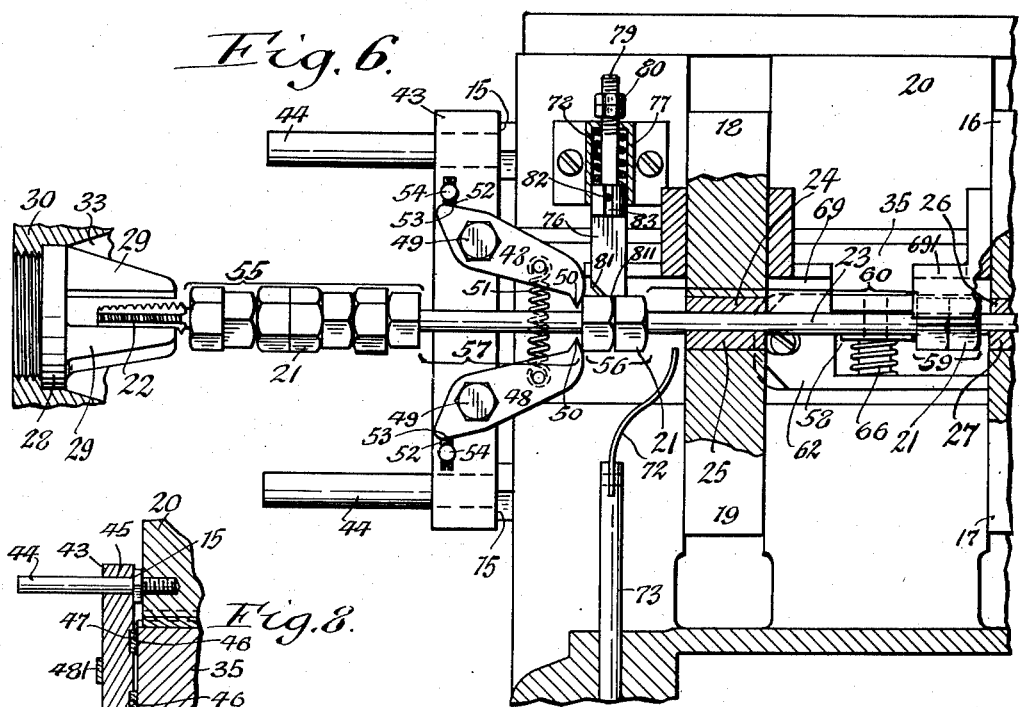
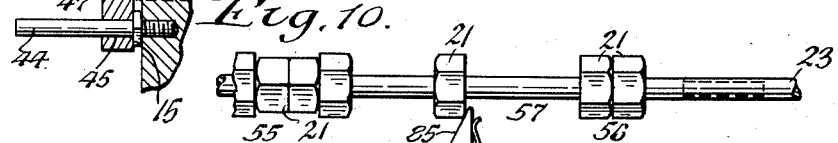
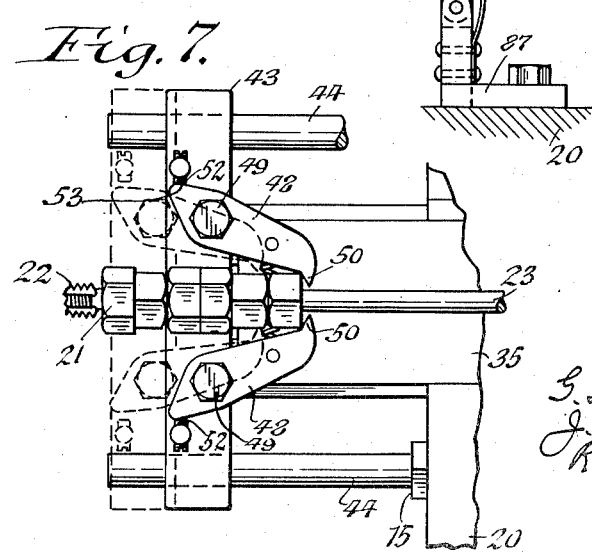
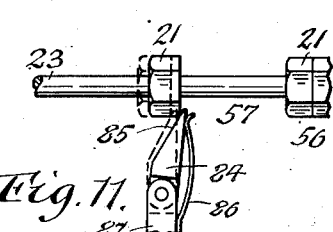
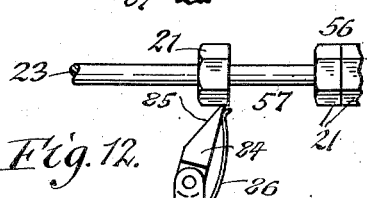

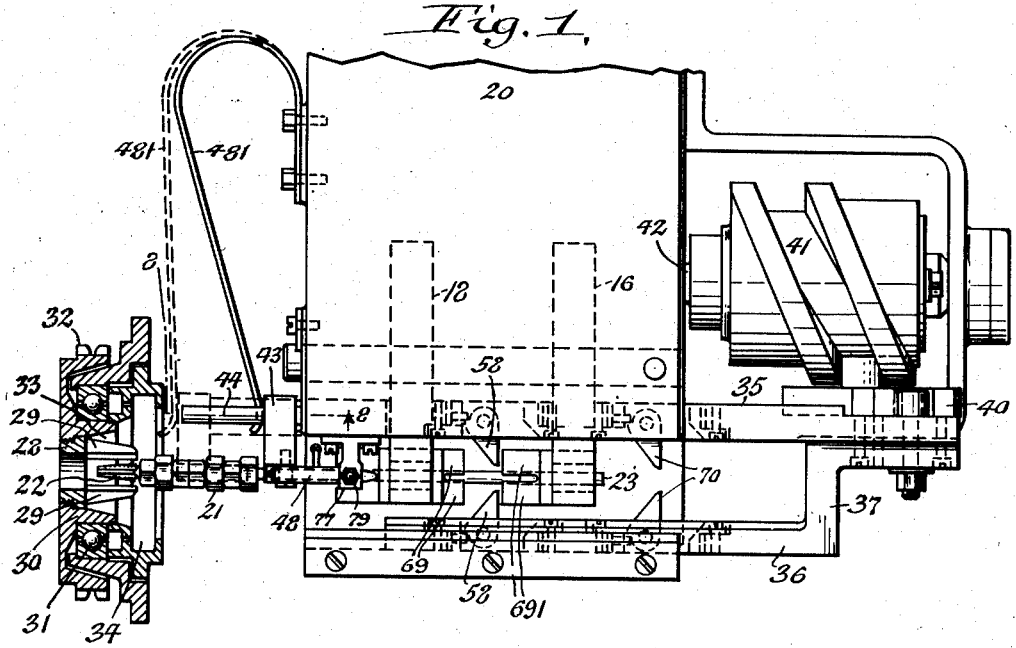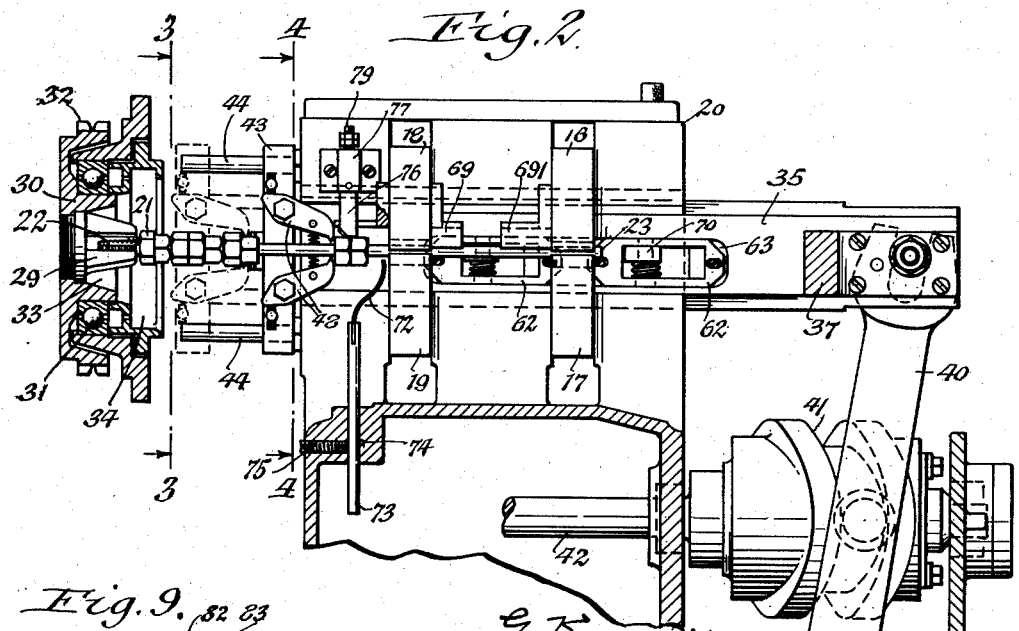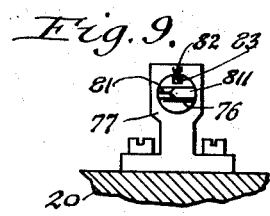

Patented Apr. 26, 1938

2,115,604

UNITED STATES PATENT OFFICE 2,115,604

NUT THREADING MACHINE

Richard L. Wilcox, Waterbury, Conn., Joseph Werner, Detroit, Mich., and George Kroupsky, Amityville, N. Y., assignors to The Waterbury Farrel Foundry & Machine Co., Waterbury, Conn., a corporation of Connecticut Application September 15, 1937, Serial No. 163,974

11 Claims. (Cl. 10—133)

This invention relates to a machine for threading screw nuts and more particularly to nut stripping mechanism whereby the screw nuts are moved from the shank of the tap after the cutters or blades on the head of the latter have cut the threads on the screw nuts.

A mechanism of this character is shown in United States patent application Serial No. 96,634 and the present invention is an improvement thereon.

In nut threading machines heretofore known the shank of the tap was alternately grasped at two different places in the length thereof by two holding devices for the purpose of enabling the nuts after the threads are cut thereon by the cutters of the tap to be moved from these cutters lengthwise of the shank and discharged from the tail end of the latter. These prior mechanisms have been unsatisfactory due to their uncertainty of operation which frequently resulted in threaded nuts being located on the shank of the tap in line with one of the tap holding devices so that when the latter were subsequently closed for gripping the shank of the tap, the misplaced nuts would be grasped and thereby cause either breakage or stoppage of the machine.

It is the object of this invention to provide a mechanism for stripping the nuts from the shank of the tap which avoids the possibility of leaving nuts in such a position on the shank that they will be grasped by the means which hold the tap against turning, thereby enabling the nut threading machine to be operated without losing time and incurring expense due to stoppage or repairs.

In the accompanying drawings:—

Fig. 1 is a fragmentary top plan view of a nut threading machine equipped with one form of mechanism for stripping the nuts from the shank of the tap in accordance with this invention.

Fig. 2 is a side elevation of the same, partly in longitudinal section.

Figs. 3 and 4 are fragmentary vertical cross sections, on an enlarged scale, taken on the correspondingly numbered lines in Fig. 2.

Fig. 5 is a fragmentary horizontal section, taken on line 5—5, Fig. 4.

Fig. 6 is a fragmentary vertical longitudinal section similar to Fig. 2. on an enlarged scale.

Fig. 7 is a similar view but showing the nut starting fingers in another position.

Fig. 8 is a longitudinal section, taken on line 8—8, Fig. 1.

Fig. 9 is a bottom plan view of the frictional detent means, taken on line 9—9, Fig. 4.

Figs. 10, 11, and 12 are fragmentary views showing various positions of the nut detent device.

In the following description similar characters of reference indicate like parts in the several figures of the drawings:—

Referring to Figs. 1-5, the numeral 20 represents the stationary main frame of the machine which may be of any suitable construction to support the several working parts of the machine comprising a tap for cutting the threads on the nuts 21, a chuck for rotating the nuts relative to the tap, holding means which grasp the tap and prevent the same from turning, and propelling means whereby the nuts are moved lengthwise of the shank of the tap from the cutter head to the tail thereof and past the means which hold the tap against rotation.

The tap is preferably arranged horizontally and lengthwise in the machine and consists of a front cutter head having a plurality of screw thread cutters or blades 22 arranged in the front part of the frame and a straight shank 23 carrying the cutters at its front end and having its tail in the rear part of the machine.

Holding means are provided for preventing the tap from turning and still permit screw nuts to be moved lengthwise over its front cutter head and along the shank thereof and discharging the same from the tail thereof. These holding means may be of any approved construction but preferably include a front tap holding device having a pair of upper and lower holding jaws 24, 25 adapted to grasp and release the central part of the tap shank at a distance rearwardly of its cutters, and a rear tap holding device arranged in rear of the front holding device and having a pair of upper and lower holding jaws 26, 27 adapted to grasp and release the tap shank near its tail Means are provided for actuating the jaws of the front and rear holding devices, which means are so organized that the jaws of the two holding devices are closed and opened alternately for holding and releasing the tap shank, but this closing and opening movement of jaws is timed so that these movements overlap one another and that at no time will both sets of holding devices be simultaneously disengaged from the tap shank, thereby causing the shank to be always grasped by one pair or the other of said devices and thus prevent the tap from turning. No particular means are shown in the drawings inasmuch as this may be accomplished in various ways, for example mechanism which includes a pair of front vertically swinging clamping levers 18, 19 supporting the front holding jaws 24, 25 and projecting transversely inward therefrom, and a pair of rear vertically swinging clamping levers 16, 17 supporting the rear holding jaws 26, 27 and projecting transversely inward therefrom.

The means for rotating the screw nuts and guiding them lengthwise while the same engage the cutters of the tap are constructed as follows:—

The numeral 28 represents the tubular hub of a chuck which is arranged in front of the cutters of the tap and axially in line therewith and 29 a plurality of guide arms projecting from this hub and arranged around the cutters of the tap.

The blank nuts which are to be threaded in the bores of their openings may be supplied to the front end of the chuck in any suitable manner and first pass rearwardly through the hub 28 of the same and thence rearwardly between the several guide arms 29 thereof. While these nuts are in the space between the several guide arms the latter engage the corners of the nuts and rotate the same and during the rearward movement of the nuts between these arms the bore of each nut passes over the cutters of the tap so that the latter cuts threads in each nut. This thread cutting operation on each nut is completed before the nut is discharged from the rear ends of the guide arms 29 and the chips or shavings of metal which are produced during this thread cutting operation together with the cutting oil which is usually squirted on the nuts and chuck at this time escape laterally outward through the longitudinal slots which are located between the adjacent guide arms and thereby leave the cutters constantly free from chips and shaving and enable them to perform their work most effectively.

The chuck may be rotatably supported and driven by various means those shown in Figs. 1 and 2 for this purpose including a tubular driving spindle 30 in which the hub of the chuck is secured and which is journaled by a ball bearing 31 on the adjacent part of the main frame, and a driven sprocket wheel 32 connected with the driving spindle and adapted to be engaged by a driving chain belt for receiving power therefrom.

The chips, shavings and cutting oil which are thrown from the chuck during the threading operation are caught by the clearance space which surrounds the guide arms of the chuck and which is formed partly by the rearwardly flaring rear part 33 of the bore in the tubular driving spindle, and an annular channel 34 which is mounted on the adjacent part of the main frame. The chips, shavings and oil pass from the chuck to the driving spindle and channel and are directed by the latter into a suitable receptacle provided for this purpose.

The preferred form of the stripping mechanism whereby the threaded screw nuts are moved from the cutters of the tap rearwardly lengthwise of its shank, past the tap holding devices and discharged from the tail end of the latter in accordance with this invention, is constructed as follows:

Movable longitudinally and horizontally in the rear part of the main frame is a main carriage which preferably comprises two longitudinal slide bars 35, 36 which are arranged on horizontally opposite sides of the shank of the tap and a cross bar 37 connecting the rear ends of these slide bars. The inner slide bar 35 is of dove-tail form in cross section and slidable lengthwise in a correspondingly shaped guideway 38 on the adjacent inner part of the main frame and the outer slide bar 36 is of rectangular form in cross section and slidable in a correspondingly shaped guideway 39 on the adjacent outer part of the main frame, as shown in Figs. 3 and 4.

A longitudindally reciprocating movement parallel with the axis of the tap is imparted to the main carriage which may be accomplished by various means, for example, by an upright rock lever 40 mounted on any available part of the main frame and operatively connected with the rear part of the main carriage, and a rotary cam 41 mounted on a longitudinal driving shaft 42 and engaging said rock shaft. As shown in Figs. 1, 3 and 4 the outer slide bar 36 of the main carriage is arranged outwardly beyond the path of movement of the clamping levers 16, 17, 18, and 19 which form part of the rear and front tap holding devices, but the inner slide bar 35 of this carriage is arranged between each pair of levers of these holding devices, thereby leaving the space above the main carriage and the parts associated therewith sufficiently unobstructed that a clear view of the essential parts of the mechanisms is obtainable and permitting of operating the machine most efficiently and enabling any adjustment and repairs to be effected more easily.

Between the front end of the main carriage and the rear side of the nut rotating and guiding chuck is arranged an auxiliary carriage 43 which preferably has the form of an upright block and reciprocates in a path along the inner side of the tap and in a direction parallel with the axis of the same. This auxiliary carriage is guided in this movement by means of two horizontal longitudinal guide rods 44 which are arranged vertically one above the other and project forwardly from a part of the main frame in rear of the chuck and engage with correspondingly located guide openings 45 in the upper and lower parts of the auxiliary carriage. The forward movement of the auxiliary carriage is effected by engagement of the front end of the inner slide bar 35 with the rear side of the auxiliary carriage the contact between these carriages being cushioned and rendered noiseless by means of fibre bumpers or cushion members 46 of disk form seated in sockets 47 in the rear side of the auxiliary carriage, as shown in Fig. 6. The backward movement of the auxiliary carriage is effected by resilient means consisting for example of a C-shaped leaf spring 481 secured at one end to the main frame and bearing at its opposite end against the front side of the auxiliary carriage, as shown in Figs. 1 and 3. The strokes of the main carriage are longer than the strokes of the auxiliary carriage inasmuch as the distance which the nuts must travel in passing the tap holding mechanism is greater than the distance which they are required to move from the cutters of the tap to the tap holding mechanism. The auxiliary carriage therefore moves forwardly with the main carriage only during the last part of the forward stroke and the first part of the rearward stroke of the latter, during which time the front end of the main carriage engages the rear end of the auxiliary carriage, but during the last part of the rearward stroke and the first part of the forward stroke of the main carriage the same is out of engagement with the auxiliary carriage and moves independently thereof while the latter is at rest. The rearward movement of the auxiliary carriage under the action of the spring 48I is arrested by stops consisting of the shoulders 15 formed on the rear parts of the rods 44 on which the auxiliary carriage slides.

The numeral 48 represents two starting fingers which are adapted to move rearwardly and forwardly with the auxiliary carriage and operate to move the nuts which gather in a group at an initial station 55 in rear of the cutters after they have been threaded and carry the same rearwardly on the tap shank to an intermediate station 56 located in front of the jaws of the front tap holding device, and thereby leave a safety gap, space or zone 57 between the nuts at station 55 and the nuts at station 56, for a purpose which will be explained hereinafter. These starting fingers are arranged lengthwise above and below, respectively, of the tap shank and are pivoted at their front ends by means of transverse pivot screws 49 on the outer side of the auxiliary carriage. At their rear ends the starting fingers are provided with relatively sharp beaks 50 which point toward each other and which are adapted to engage the front ends of the screw nuts and move them from the initial station 55 in rear of the cutters of the tap rearwardly on the tap shank and to the intermediate station 56 in front of the first tap holding device. A spring 51 connects the starting fingers for drawing them together and holding them yieldingly in engagement with the screw nuts which are to be propelled. The movement of the starting fingers toward the tap shank is limited so their beaks do not engage with the tap shank but project into the path of the screw nuts, these stop means consisting preferably of stop screws 52 adapted to be engaged by stop shoulders 53 on the front parts of the starting fingers and mounted on pins 54 projecting outwardly from the adjacent parts of the auxiliary carriage, as best shown in Figs. 3 and 6.

The numeral 58 represents a pair of front stripping or sweeping fingers whereby the screw nuts are carried from the intermediate station 56 in front of the front tap holding device to a final station 59 on the tap shank between the front and rear tap holding devices and leave a gap or space 60 between the nuts at stations 56 and 59. The members of the front pair of stripping fingers are arranged on opposite sides of the tap shank and each is pivoted by means of a vertical pin 61 on a part of the main carriage so that these two stripping fingers can either assume a rearwardly inclined position when moving forwardly with the main carriage, as shown by dotted lines in Fig. 5, for the purpose of tripping past any parts of the front holding device with which they may engage during such forward movement and also may assume a transverse position for engaging the front side of a screw nut, as shown by full lines in Fig. 5, preparatory to moving this nut rearwardly on the tap shank from the intermediate state 56 to the final station 59. If desired each of these front stripping fingers may be pivoted directly on the slide bars of the main carriage and held yieldingly in their transverse operative position but it is preferable to mount each of these front stripping fingers on its respective slide bar so that the same can be adjusted bodily in a direction lengthwise of the movement of the main carriage for the purpose of enabling these fingers to accurately engage with the front side of the screw nuts which are to be propelled rearwardly on the tap shank.

The preferred means for accomplishing this purpose are constructed as follows and shown in Figs. 2, 4, and 5:—

The numeral 62 represents adjusting blocks which are arranged in slots 63 in the front parts of the slide bars 35, 36 of the main carriage and each of these blocks having an opening which receives the outer end of one of the stripping fingers and carries the pivot pin 61 of one of the front stripping fingers. Each of these adjusting blocks is capable of adjustment lengthwise of the main carriage to a limited extent on the respective slide bar and after the same has been so placed that its stripping finger will properly engage the front ends of the nuts then this block is firmly secured to this bar by fastening screws 64 passing through slots 65 in said blocks. Each of the pivot pins is surrounded by a spring 66 which is connected at its opposite ends with the respective front stripping finger and adjusting block and which tends constantly to move this finger from its inclined inoperative position to its transverse operative position. For the purpose of arresting each front stripping finger after the same has reached its transverse operative position stop means are provided which preferably consist of a stop pin 67 arranged on the adjusting block and adapted to be engaged by a stop shoulder 68 on the respective stripping finger, as shown in Fig. 5.

The reciprocating movement of the main carriage is such that when the same is in its rearmost position the front stripping fingers are arranged in rear of the jaws of the front tap holding device and in front of the jaws of the rear tap holding device and when this carriage is in its foremost position the front pair of stripping fingers are arranged in front of the jaws of the front tap holding device. When the main carriage moves forwardly the jaws of the front tap holding device are closed and the front stripping fingers will move forwardly past the front tap holding jaws without interfering with the latter and also move past the screw nuts located at the intermediate station 56 and then spring into their operative transverse position into the nut-free safety gap 57 between the screw nuts located at the initial and intermediate stations preparatory to effecting the next rearward movement of this carriage during which the front stripping fingers engage the front side or end of the screw nut or nuts located at the intermediate station and move the last mentioned nuts to the final station 59 beween the front and rear pairs of holding jaws. During this forward movement of the front stripping fingers with the carriage while the jaws of the front tap holding device are closed, the front stripping fingers will be folded into a rearwardly inclined position by engaging deflecting cheeks or guards 69 on the longitudinally opposite sides of the upper jaw 24 of the front tap holding device, as shown by dotted lines in Fig. 5. The front pair of stripping fingers will thus be held in this inoperative position during the entire forward stroke of the main carriage and until the front tap holding jaws are opened and when this occurs the front stripping fingers are released from the guard cheeks 69 and turned by their springs 66 toward each other and into the safety gap or clearance space 57 between the nuts at the initial and intermediate stations. Proper engagement is thus assured of these stripping fingers with the front side of the nut or nuts which may be present at the intermediate station preparatory to moving the same rearwardly past the jaws of the front tap holding device and to the final station between the pairs of jaws of the front and rear tap holding devices.

The numeral 70 represents a pair of rear stripping or sweeping fingers which are mounted, respectively, on the rear parts of the slide bars of the main carriage on opposite sides of the rear part of the tap shank and which are adapted to engage with opposite sides of the front ends of the screw nuts and move the same from the final station 59 rearwardly past the jaws of the rear tap holding device and off the tail end of the tap shank. Each of these rear stripping fingers is mounted on the respective slide bar of the main carriage in the same manner as the front stripping fingers are mounted on the slide bars of this carriage and the same description and identifying characters are therefore applicable to both the front and rear sweeping fingers.

Upon moving the rear pair of stripping fingers forwardly while the jaws of the rear tap holding device are closed, the rear pair of stripping fingers engage with guard cheeks 691 arranged lengthwise on transversely opposite sides of the upper jaw 26 of the rear tap holding device and will be deflected laterally thereby and held in an inoperative position up to the end of the forward stroke of the main carriage but when the rear tap holding jaws are opened the rear stripping fingers are released therefrom, and when this occurs the springs of these fingers turn the latter into their operative transverse position in front of the nuts at the final station so that during the following rearward stroke of the main carriage the nuts will be moved past the rear holding jaws and off the tail of the tap shank.

The timing of the forward and backward movement of the main carriage and the opening and closing movement of the tap holding jaw is such that the main carriage effects a forward and backward movement for the opening and closing operation of each pair of tap holding jaws so that the nut stripping mechanism performs two cycles of operations for each cycle of operations of the tap holding mechanism thereby insuring removal of the nuts as fast as they are threaded.

For the purpose of enabling the starting mechanism to move the nuts rearwardly along the shank of the tap so as to leave a nut-free safety space between the first group which is arranged in the rear of the tap cutters and the second group which is arranged in front of the tap holding mechanism, the starting mechanism is moved at a higher rate of speed than the rate of movement of nuts along the cutters of the tap, thereby enabling the stripping mechanism to enter this nut-free safety space and move the nuts in the second group rearwardly relatively to the tap and the tap holding mechanism.

Means are provided for preventing one or more screw nuts while being moved rearwardly by the starting fingers from being thrown to such an extent that the same might come to rest between the jaws of the front tap holding device and possibly break or stop the machine. To avoid such a result a resilient stop 72 is provided having preferably the form of an upright strip of spring metal the upper end of which is arranged in the path of the screw nuts between the rear end of the intermediate nut resting station 56 and the front tap holding jaws. The lower end of this resilient strip is secured to an upright supporting post 73 which is adjustable vertically in a socket 74 in the main frame and held in place by a set screw 75. When the front stripping fingers engage the front side of the nuts at the intermediate station 56 and positively move the same rearwardly past the front holding jaws and to the final resting station 59 this resilient stop is deflected out of the path of the screw nuts and does not interfere with the rearward movement of the same.

In order to positively insure against breakage or stoppage of the machine it is essential that the safety clearance space or gap 57 be maintained between the group of screw nuts at the initial station 55 and the group of screw nuts at the intermediate station 56 so that the front stripping fingers when in their foremost position will always be able to enter this space or gap and engage properly with the front side of the nut or nuts which are located at the intermediate station and move the same past the front holding jaws and to the final station between the front and rear holding jaws. Detent safety means are therefore provided whereby any screw nuts which have been properly engaged on their front sides by the starting fingers will be moved by the latter into a position in rear of the safety gap 57 to the intermediate station and any screw nuts which have been improperly engaged by the starting fingers and liable to be left in an uncertain position on the tap shank at the end of the rearward stroke of the auxiliary carriage will be returned again to the group of nuts in front of the safety gap 57. In their preferred form these detent safety means, as shown in Figs. 1, 2, 3, 4, and 7 are constructed as follows:—

The numeral 76 represents a detent member having the form of a detent or bearing block or shoe which is adapted to bear at its inner end against the longitudinal side of one or more screw nuts which are pushed rearwardly on the tap shank by the starting fingers to the intermediate station in rear of the safety gap 57. This detent block is movable transversely and yieldingly held in its innermost position in which its inner end projects into the path of the screw nuts and is adapted to be pushed sidewise by the screw nuts out of the path of the same so that the nuts will be engaged frictionally on their sides by the detent block. For this purpose the detent block is guided at its outer end in a guide casing 77 secured to the adjacent part of the main frame and yieldingly pressed inwardly by a spring 78 interposed between the top of the guide casing and the upper end of the detent block. The inward movement of the detent block under the action of this spring is limited and capable of being adjusted by a stop rod 79 projecting from the detent block through the top of the guide casing and stop nuts 80 threaded on the upper end of the stop rod and adapted to engage the top of the guide casing. For the purpose of enabling the rearwardly moving nuts on the tap shank to lift or deflect the detent block the front inner corner of the same is bevelled, as shown at 81. As the nuts are moved rearwardly by the starting fingers the same engage the incline 81 of the detent block and lift the same by a wedge action sufficiently to permit the nuts to pass rearwardly and then the nuts are held frictionally against forward movement by the action of the spring 78 which presses the rear straight part 811 of the detent block against the side of the nuts.

It sometimes happens that screw nuts properly engaged on their front sides by the beaks of the starting fingers and moved by the latter rearwardly from the initial station 55 to the intermediate station 56 will drag along some trailing screw nuts which are struck to the properly engaged nuts by the adhesive effect of oil, chips or shavings, and when this occurs the detent block or shoe by frictional engagement with the properly engaged nuts will hold the latter in rear of the safety space, but said trailing nuts will be engaged at their rear ends by the beaks of the starting fingers and carried forwardly out of the safety space and back to the group of nuts at the initial station, as shown by full lines in Fig. 7. If the starting fingers, while in their foremost position, improperly engage the screw nuts at the initial station, such as occurs when the beaks of these fingers bear against the flat sides of the nuts, as shown by dotted lines in Fig. 7, then these improperly engaged nuts will be moved rearwardly on the tap shank by the grip of the starting fingers until these nuts engage the detent friction block and in that event these nuts will be arrested in their rearward movement by this block and the beaks of the starting fingers during their continued rearward movement up to the end of this stroke will slip rearwardly on the lateral flat sides of these nuts until these beaks are drawn together by the spring connecting the starting fingers, so that their beaks engage with the rear ends of these nuts. As a consequence these improperly gripped screw nuts will be returned by the starting fingers from a position immediately in front of the detent block to the group of nuts at the initial station, as shown by full lines in Fig. 7, and thus avoid leaving these nuts stand in the safety gap where they would interfere with the proper movement of screw nuts past the tap holding mechanism.

It has been found by actual experience that when no detent means are employed that the nuts when engaged on their flat sides by the starting fingers are liable to be liberated by the starting fingers either during their rearward movement or their forward movement and leave the nut at some indefinite place on the tap shank so that it is liable to lodge on the tap shank in line with the tap gripping jaws and thus either break the machine or cause stoppage of the same. By the use of the above described nut detent means an open safety space in the column of nuts on the tap shank for the reception of the front pair of stripper or sweeper fingers is always assured, thereby eliminating frequent stoppage of the machine or the necessity for repairs in the event of breakage.

In the preferred construction of the detent block the face of the bevelled lower front corner is made V-shaped in cross section, as shown in Fig. 9, whereby a nut which presents one of its corners to the detent block will first engage one of its corners with one side or the other of this V-shaped face and thereby cause the nut to be turned and present one of its flat sides to the detent block so that the latter can obtain a more effective frictional grip thereon. Turning of the detent block in its guide casing is prevented by a spline pin 82 arranged on the guide casing and engaging with a vertical groove 83 in the detent block, as shown in Figs. 4 and 9.

The strength of the stop spring 72 is considerably lighter than that of the starting or dividing spring 481 so as to permit the nuts while under the pressure of the starting spring to deflect the stop spring and pass rearwardly over the latter. When, however, a nut is kicked rearwardly with considerable force by the momentum of the auxiliary carriage, or when the detent block or shoe 76 rides only in engagement with a corner of a nut and the next rearward or preceding nut presents its flat side to the detent block, then this preceding nut is too free until the following nut engaged on a corner by the detent block has been turned to present one of its flat sides to the detent block. A preceding nut when thus left free or a nut thrown rearwardly with excessive power by the momentum of the auxiliary carriage will be arrested by the yielding stop 72 and prevented from being thrown into the mouth of the jaws of the front tap holding device while the latter is in its open position.

The modified form of this invention shown in Figs. 10, 11, and 12 is constructed as follows:—

In this modified form the detent means are so organized that the same prevent the nuts, which have been improperly gripped by the starting finger, from entering the safety space or zone 57 which should be free or clear in order that the front stripping fingers may properly engage the group of nuts in the intermediate station for subsequent movement past the tap holding mechanism. This modified construction comprises a detent member 84 which has the form of a finger having an inclined inner end 85 which is yieldingly held by a spring 86 in the path of the column of screw nuts on the tap shank in front of the safety space or gap 57. This finger is pivoted at its outer end on a bracket 87 secured to the adjacent part of the main frame and this bracket also carries the spring 86, as shown in Fig. 10.

If a screw nut in the group at the initial station is engaged on its front side by the starting fingers then the same will be positively carried rearwardly past the safety zone or gap 57 and to the group of nuts at the intermediate station 56 preparatory to being moved past the tap holding mechanism in the manner previously described, but if a nut is moved rearwardly on the tap shank by engagement of the starting fingers with the flat sides of a nut then the latter will be arrested by the detent finger 84, as shown in Fig. 10, and the starting fingers will slip rearwardly off the respective nut and move idly to the end of the rearward stroke. During the subsequent forward stroke of these starting fingers the latter will carry the improperly gripped nut forwardly from the detent finger 84 to the nuts in the initial station, thereby leaving the safety gap free from nuts for the purpose heretofore explained. If during the rearward movement of a nut upon engaging the detent finger 84, the latter should be deflected slightly, as shown by full lines in Fig. 11, previously to the starting fingers slipping off the respective nut, then the latter will be again pushed forward to the extent of this deflection, as indicated by dotted lines in Fig. 11, after the nut has been released from the starting fingers, and thus prevented from being left standing in the safety gap. If during the rearward movement of the starting fingers the same engage with the sides of a nut with sufficient friction to deflect the detent finger 84 until the latter engages the side of the respective nut, as shown in Fig. 12, and thereafter the starting fingers slip off this nut, then the latter will be held frictionally by this detent finger and prevented from reaching the safety gap 57, but on the next forward stroke of the starting fingers this nut will be carried by them back to the group of nuts in the initial station.

From the foregoing description it will now be evident that in the operation of both forms of this invention a safety zone or space will be maintained between the first and second groups of nuts on the shank of the tap which is always open or free from nuts and thus enables the nut stripping mechanism while in its foremost position to positively engage with the front side of those nuts in the second group and move the latter rearwardly with absolute certainty past the tap holding mechanism and off the rear end of the tap shank, thereby avoiding any possibility of nuts being left between those parts of the tap holding mechanism which are adapted to grip the tap shank and eliminating stoppage of the machine or breakage of any of its parts. It will be evident that if any screw nuts were permitted to stand in the safety gap on the tap shank that this would defeat the purpose of this machine because the presence of nuts in this gap would cause the front pair of stripping fingers to conflict with such misplaced nuts by striking them when attempting to enter this gap at the end of the forward stroke of the main carriage and possibly move these nuts into a position in which they would come between the jaws of the tap holding mechanism and prevent the latter from performing its function.

During the operation of the machine both the front and rear tap holding devices are closed and gripping the tap shank during each forward movement of the main carriage which moves the front and rear pairs of stripping fingers forwardly and during this time the front and rear stripping fingers engage respectively with guard cheeks of the front and rear tap holding devices and are held in an inoperative position so that this stroke of the main carriage is idle. At the end of one forward movement of the main carriage the front tap holding device opens and its guard cheek permits the front stripping fingers to snap into an operative position in front of the screw nuts at the intermediate station and during the next following backward movement of the main carriage the front stripping fingers move the screw nuts from the intermediate station, past the front tap holding device and to the final station and at the same time the rear, stripping fingers move idly rearwardly in engagement with the guard cheeks of the rear tap holding device. At the end of the next forward movement of the main carriage the rear tap holding device opens and permits the rear stripping fingers to snap into operative position in front of the nuts at the final station and during the next rearward movement of the main carriage the rear stripping fingers move the screw nuts from the final station, past the rear tap holding device and off the tail end of the tap shank, and at the same time the front stripping fingers move idly rearwardly in engagement with the guard cheeks of the front tap holding device. It follows from this construction that each group of nuts after having been divided from the column at the initial station in rear of the thread cutters are moved to the intermediate station and then moved by successive steps from the intermediate station to the final station and then moved from the final station off the tail end of the shank. It is to be understood that the gripping action of the front and rear tap holding devices overlap each other so that the tap is always gripped by one or by both of these holding devices.

In actual operation of the machine both tap holding devices grip the shank of the tap at the same time during approximately 200 degrees of each rotation of the cam 41 which operates the nut stripping mechanism or 100 degrees of the rotation of the cam which operates the tap shank gripping mechanism, or the equivalent parts of a complete cycle of operations of the machine.

By these means the screw nuts are not displaced during the forward idle movements of the stripping fingers and this permits the screw nuts to be engaged at their front ends definitely and certainly and swept from the shank of the tap positively, whereby interruption in the operation of the machine is avoided, its output increased and the cost of threading nuts is reduced.

We claim as our invention:

1. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means operating on said screw nuts and preventing the same from resting in said safety space.

2. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means operating on the screw nuts while the same are in said second group and prevent forward movement thereof into said safety space.

3. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means adapted to engage frictionally with the screw nuts while the same are in said second group and prevent forward movement thereof into said safety space.

4. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means adapted to engage frictionally with the screw nuts while the same are in said second group and prevent forward movement thereof into said safety space, said detent means including a stationary guide, a bearing block slidable on said guide and having a bearing face adapted to be engaged by the nuts in said second group and to be shifted laterally by the same, and spring means for holding said bearing block yieldingly in the path of said screw nuts.

5. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means adapted to engage frictionally with the screw nuts while the same are in said second group and prevent forward movement thereof into said safety space, said detent means including a laterally movable bearing block adapted to project at its inner end into the path of said screw nuts and having an inclined front part which is adapted to be engaged by said nuts for moving this block out of the path of the nuts and an inner bearing face adapted to engage with the side of the nuts while in said second group.

6. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means adapted to engage frictionally with the screw nuts while the same are in said second group and prevent forward movement thereof into said safety space, said detent means including a laterally movable bearing block adapted to project at its inner end into the path of said screw nuts and having an inclined front part which is adapted to be engaged by said nuts for moving this block out of the path of the nuts and an inner bearing face adapted to engage with the side of the nuts while in said second group, said inclined front part of the bearing block being of V-shape form in cross section and adapted to engage one side or the other of said V-shape with a corner of a screw nut moving rearwardly on the tap shank for turning said nut and presenting a flat side thereof to the bearing face of said bearing block.

7. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means adapted to engage frictionally with the screw nuts while the same are in said second group and prevent forward movement thereof into said safety space, said detent means including a laterally movable bearing block adapted to project at its inner end into the path of said screw nuts and having an inclined front part which is adapted to be engaged by said nuts for moving this block out of the path of the nuts and an inner bearing face adapted to engage with the side of the nuts while in said second group, a stationary guide on which said block slides, a spring interposed between said guide and block and operating to hold the latter yielding in the path of the screw nuts, and stop means for limiting the movement of said block toward the path of said nuts.

8. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means adapted to engage frictionally with the screw nuts while the same are in said second group and prevent forward movement thereof into said safety space, said detent means including a laterally movable bearing block adapted to project at its inner end into the path of said screw nuts and having an inclined front part which is adapted to be engaged by said nuts for moving this block out of the path of the nuts and an inner bearing face adapted to engage with the side of the nuts while in said second group, a stationary guide on which said block slides, a spring interposed between said guide and block and operating to hold the latter yieldingly in the path of the screw nuts, and stop means for limiting the movement of said block toward the path of said nuts including a stop rod connected with said block, and stop nuts arranged on said rod and adapted to engage said guide.

9. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said holding mechanism including starting means which operate to divide the column of nuts on said shank into a first group arranged immediately in rear of said tap cutters and a second group arranged in front of said tap holding mechanism and separated from the first group by an intervening nut free safety space, stripping means having parts adapted to enter said safety space and engage the front side of the second group of nuts and move the latter rearwardly past said tap holding mechanism, and detent means operating on said screw nuts and preventing the same from resting in said safety space, said detent means including a finger adapted to project at its inner end into the path of said nuts and provided with an inclined front side, a stationary bracket on which said finger is pivoted at its outer end and a spring for yieldingly holding said finger in the path of said nuts.

10. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said tap holding mechanism including a longitudinally reciprocating main carriage, stripping fingers mounted on the main carriage and adapted to engage the front side of the nuts and move them rearwardly on the shank past the tap holding mechanism, an auxiliary carriage adapted to be moved forwardly by the main carriage, spring means adapted to move the auxiliary carriage rearwardly having one of its parts secured to a stationary support and another of its parts engaging with said auxiliary carriage, starting fingers mounted on said auxiliary carriage and adapted to engage the nuts and move the same rearwardly along the tap shank from the cutters thereon to said stripping fingers, and a spring connecting said starting fingers.

11. A machine for threading screw nuts comprising a tap having cutters and a shank, a holding mechanism adapted to grasp said shank for preventing the tap from turning, a chuck adapted to rotate the nuts relative to the cutters of the tap, and a propelling mechanism for moving the nuts off said shank and past said tap holding mechanism including a longitudinally reciprocating main carriage, stripping fingers mounted on the main carriage and adapted to engage the front side of the nuts and move them rearwardly on the shank past the tap holding mechanism, an auxiliary carriage adapted to be moved forwardly by the main carriage, spring means for moving said auxiliary carriage rearwardly, cushion means interposed between said auxiliary carriage and main carriage and starting fingers mounted on said auxiliary carriage and adapted to engage the screw nuts and move them rearwardly on the tap shank from the cutters thereon to said stripping fingers.

RICHARD L. WILCOX.
JOSEPH WERNER.
GEORGE KROUPSKY.